United States Patent [19]

Mansel

[11] 4,118,134
[45] Oct. 3, 1978

[54] FASTENER JOINT AND METHOD THEREOF

[75] Inventor: Orin C. Mansel, Grand Rapids, Mich.

[73] Assignee: Lescoa, Inc., Grand Rapids, Mich.

[21] Appl. No.: 458,990

[22] Filed: Apr. 8, 1974

[51] Int. Cl.² ............................................. F16B 11/00
[52] U.S. Cl. ...................................... 403/282; 403/359
[58] Field of Search ..................... 403/282, 359, 263; 29/432, 525; 151/41.73; 85/37

[56] References Cited

U.S. PATENT DOCUMENTS

| 2,419,862 | 4/1947 | Wales | 29/432 UX |
| 3,039,798 | 6/1962 | Carlson et al. | 403/11 |
| 3,084,502 | 4/1963 | Herold | 29/525 UX |

*Primary Examiner*—Andrew V. Kundrat
*Attorney, Agent, or Firm*—Price, Heneveld, Huizenga & Cooper

[57] ABSTRACT

A fastener joint assembly and method for joining the crank arm plate to the pivot shaft in a vehicular windshield wiper crank arm assembly. A varying sized opening formed in the crank plate engages a corresponding knurl on the shaft. The opening is formed by providing a punch and an enlarged die member so that as the opening is pierced, the material at the lower portion of the opening at the enlarged die opening breaks out forming a larger diameter opening at the bottom of the plate. The root diameter of the knurled portion of the shaft corresponds generally to the smaller diameter opening in the plate. The larger diameter portion of the plate opening corresponds generally to the outer diameter of the knurl. As the shaft is driven into the plate at the smaller opening, the material surrounding the smaller opening flows into the larger diameter portion and the knurl forms a positive connection between the shaft and the plate.

8 Claims, 7 Drawing Figures

FASTENER JOINT AND METHOD THEREOF

BACKGROUND OF THE INVENTION

This invention relates to a vehicular windshield wiper crank assembly and more particularly to a novel method and joint assembly for joining the crank plate to the wiper pivot shaft. The prior art is replete with arrangements in general for connecting stud members and the like to a metal plate which typically rely in some fashion on an interference fit between the members to provide a secure joint. Typically, a stud member includes a spline or knurled portion which is pressed into a corresponding opening formed in a plate member having a softer material than the stud. The knurled portion may be provided with a tapered leading end which is driven into the opening in the plate or alternately, a chamfered opening is provided in the plate and the stud is forced into the opening at the chamfer position. As the stud member is forced therein, the softer material in the plate flows around the splines or knurled portion of the stud member. To assure permanence of the connection, heat may be applied causing the material to melt and flow into the splined areas of the shaft. Often, it is necessary to subject the assembly to heat treatment to attain the necessary hardness of the plate material. If the connection is to be subjected to rotary and axial torques, it is further necessary to provide additional material for welding or staking the shaft to the plate.

With regards to windshield wiper crank assemblies, the wiper blade pivot shaft and crank plate are comprised of metal or steel of similar hardness. Formation of the subject joint in this environment will cause shearing of the post knurls rather than a positive deformity causing a tight interference such that the joint will not withstand specified torque tests. Thus, the prior art relating to windshield wiper crank assemblies have joined the pivot post to the crank plate by staking, welding shrinkage, or expansion fits, hot upset and like processes which generally are time consuming, expensive procedures and which must be held to extremely close tolerances.

SUMMARY OF THE INVENTION

In accordance with the present invention, the fabrication of a vehicular windshield wiper crank assembly is considerably simplified. The assembly includes a crank means or plate member joined to one end of a pivot shaft. An opening is formed through the crank means so as to have a portion of reduced diameter and an enlarged diameter portion. One end of the pivot shaft is provided with a knurled portion, the root diameter of the knurled portion corresponding generally to the reduced diameter portion of the opening. The knurled end of the shaft is driven into the crank arm through the reduced diameter opening causing the material surrounding the opening to flow into the enlarged diameter portion to thereby form a positive joint.

In a narrower aspect of the invention, the shaft and plate means are formed of materials having similar hardness to thereby overcome the disadvantages of the prior art techniques wherein the assembly must be subjected to further heat treatment after the crank and the shaft are connected.

In yet another aspect of the invention, a fastener joint is provided by driving a first member of high tensile or stress-proof steel into a second member of similar type material utilizing a dissimilar sized opening. The first member is driven into the second through the smaller portion of the opening.

The many objects and advantages of the present invention will become readily apparent to those skilled in the art from a consideration of the following detailed description of a preferred embodiment when read in conjunction with the accompanying drawings.

DESCRIPTION OF THE PREFERRED EMBODIMENT

Figure 1:
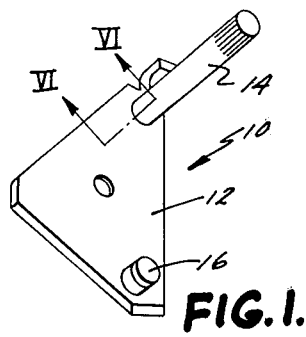
FIG. 1 is a perspective view of an assembly in accordance with the invention.

Referring now to the drawings, an automotive windshield crank arm assembly incorporating the teachings of the invention is illustrated in FIG. 1 and generally designated by the numeral 10. Assembly 10 includes a crank arm or plate member 12 to which is secured a stud or pivot shaft 14. The pivot shaft is adapted for connection to an automotive wiper arm assembly (not shown) in a conventional manner. Similarly, arm 12 is equipped with one or more stud members 16 adapted for connection to suitable linking and driving means (not shown) to cause pivot shaft 14 to oscillate with movement of crank 12 in a conventional well-known manner.

Figure 3:
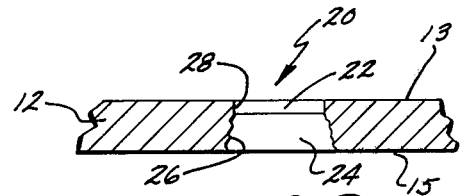
FIG. 3 is an enlarged cross-sectional view of the plate member shown in FIG. 1 illustrating the differing sized opening formed therethrough.

The improvement of the present invention resides in the attachment of a stud or like member as pivot shaft 14 to a plate member as crank arm 12 as will be hereinafter described. As shown in FIG. 3, plate 12 is provided with an opening 20 generally tapering outwardly from a top surface 13 to a bottom or lower surface 15. The opening 20 is formed as by a piercing or punching operation to provide a varying sized opening. Opening 20 includes a first smaller diameter portion 22 at top surface 13 and a second larger diameter portion 24 opening at lower surface 15. As illustrated in the enlarged view of FIG. 3, the small diameter portion 22 has a generally smooth wall surface 28 while the larger diameter portion 24 has a roughened wall surface 26 caused as the material breaks away during formation.

Figure 4:
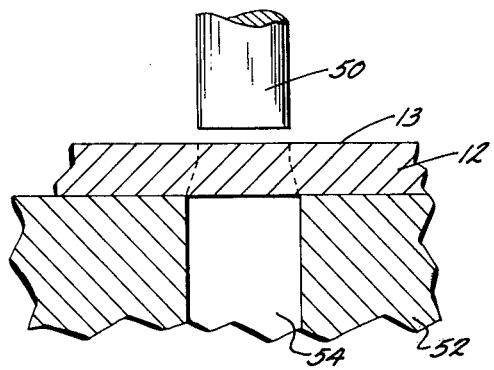
FIG. 4 is a cross-sectional view of the plate member, punch and die for forming the varying sized opening therethrough.

With additional reference to FIG. 4, the varying sized opening 20 is formed by means of a punch 50 and a die 52 mounted in a press in a conventional manner. The diameter of punch 50 corresponds to the diameter of the smaller opening 22 in plate 12. An opening 54 in die 52 corresponds to the diameter of the larger opening 24 in plate 12. The varying sized opening 20 is formed by driving the punch 50 downwardly toward the opening 54 in die 52. As the punch moves through the plate 12 toward the die, a shearing action occurs along a part of the thickness of plate 12 to form the smooth wall surface 28 in smaller diameter opening 22. As the punch travels toward the die, about one-quarter the thickness of plate 12 is sheared and metal breakout occurs as the slug (not shown) is released from the material of the plate thereby forming the larger diameter opening 24 along the remaining approximately three-quarters of the plate thickness. The breakout length of the opening through plate 12 and is preferably the remaining two-thirds or three-quarters of the thickness of the plate 12. The variable sized opening can, of course, be controlled by varying the diameter of the punch 50 with respect to opening 54 in the die.

Figure 2:
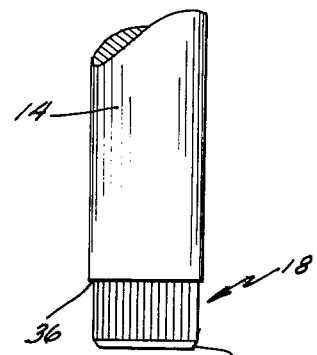
FIG. 2 is an enlarged partial view of the shaft member adapted to be received in the plate member shown in FIG. 1.
Figure 7:
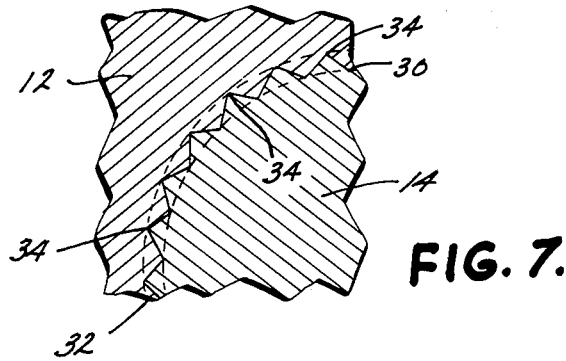
FIG. 7 is a cross-sectional view taken along the plane VII—VII of FIG. 6.

Referring additionally to FIGS. 2 and 7, at least one end of shaft 14 is provided with a knurled or splined portion 18 for attachment in opening 20 of plate 12. Shaft 14 is formed of stress-proof steel as, for example, SAE 1144 steel or its equivalent. Plate 12 is formed of a corresponding high tensile strength material as, for example, MS 264-50 machine steel.

Knurled portion 18 of shaft 14 is a straight knurl and includes a plurality of teeth or serrations 34 (FIG. 7) formed by a knurling tool in a conventional manner. The outermost ends of the individual teeth form an outer diameter 32 illustrated by the dashed lines in FIG. 7 corresponding closely to the diameter of the larger opening 24 in plate 12. The bottom or root of teeth 34 forms an inner or root diameter 30 (also illustrated by dashed lines) corresponding closely to the smaller opening 22 in plate 12. The outer diameter 32 of the knurled portion 18 is slightly less than the diameter of shaft 14 to provide an annular shoulder 36 between the knurled portion 18 and the shank of shaft 14. The leading end of the knurled portion 18 is provided with a slight annular chamfer 38 having a diameter slightly less than the small diameter opening 22 for ease of positioning therein during assembly.

Figure 6:
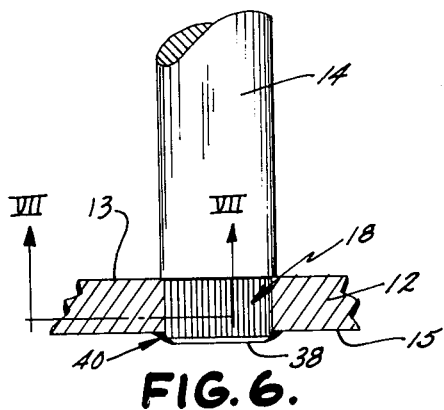
FIG. 6 is a cross-sectional view of the shaft and plate member taken generally along the plane VI—VI of FIG. 1.
Figure 5:
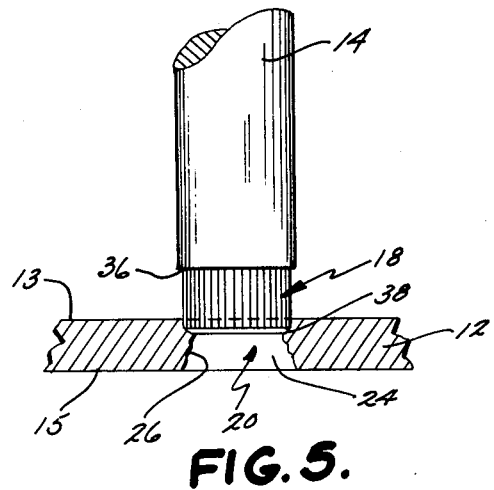
FIG. 5 is a cross-sectional view illustrating the insertion of the shaft member of FIG. 2 into the plate member of FIG. 3.

Assembly of the shaft and plate is illustrated in FIGS. 5 and 6. Shaft 14 is positioned on top surface 13 of plate 12 with chamfer 38 positioned in the smaller diameter portion 22 of opening 20. The shaft is then pressed into the plate 12 by means of a conventional press or the like (not shown). As the teeth 34 (FIG. 7) of the knurled portion 18 engage the material surrounding the smaller diameter opening 22, the wall material 28 flows downwardly and into the larger diameter opening 24. The material flows between the individual teeth 34, from the inner diameter of the teeth to the outer wall surface 26 of the larger diameter opening 24. The wall material 28 does not break away but rather is deformed and flows to engage teeth 34 between the inner and outer diameters and wall area 26 to thereby positively lock the shaft into the plate. The shaft is pressed into the plate until shoulder 36 abuts top surface 13 of the plate. A strong connection between the shaft and the plate results, as shown in FIG. 7. The shaft will not rotate with respect to the plate. A rotary torque applied with respect to the shaft and plate, within reasonable limits, will not cause breakage.

In one typical example of a windshield wiper crank arm assembly incorporating the teachings of the invention, a shaft 12 having a nominal diameter of 0.369 inches was provided with a twenty-line full depth straight knurl to have an outer diameter of 0.360 inches. The shaft material was LaSalle Stress Proof Steel, and the knurl length was 0.185 inches. The plate member was formed of MS 264-50 steel stock having a thickness of 0.152 inches. The plate was provided with a differing sized opening 20 as illustrated in the figures with a smaller diameter of 0.317 inches at top surface 13 while the larger diameter portion as measured at lower surface 15 was 0.354 inches. After the stud was installed as described hereinabove, the force required to cause relative movement between the plate and the shaft was found to be well in excess of 60 foot pounds of rotary torque, greatly in excess of that attainable by conventional prior methods.

Referring again to FIG. 6, to prevent axial forces from disconnecting the shaft from the plate, the chamfered end 38 and the protruding knurled portion may be rolled over and staked, as illustrated by the numeral 40, to plate 12 in a conventional manner. Forces acting axially along shaft 14 will therefore not pull shaft 14 from the plate.

In view of the foregoing description, those skilled in the art will appreciate the many advantages of the present invention. The construction and assembly of two relatively hard materials may be readily accomplished with a minimal effort, rapidly, and with the attendant cost saving advantages. Those so skilled will also recognize that many modifications can be made and it is intended that the equivalent arrangements be covered unless the following claims by their wording expressly state otherwise.

The embodiments of the invention in which an exclusive property or privilege is claimed are defined as follows:

1. In a vehicular windshield wiper crank assembly including a crank means joined to one end of a pivot shaft, said crank means and said pivot shaft being formed of material of similar hardness, the improvement comprising: said crank means having an opening formed therethrough with a reduced diameter portion and an enlarged diameter portion, said one end of said pivot shaft having a knurled portion, the root diameter of said knurl corresponding generally to said reduced diameter portion of said opening formed through said crank means, said knurled portion being driven into said opening initially through said reduced diameter portion causing deformation of at least one of said knurled portion or the material surrounding said reduced diameter portion to cause material to flow into said enlarged diameter portion to form a positive joint.

2. The wiper crank assembly of claim 1 wherein the material surrounding said reduced diameter portion flows into said enlarged diameter portion.

3. The crank assembly of claim 2 wherein the wall surface areas defining said first diameter portion of said opening surface extending less than one-half of the thickness of said crank arm and the wall surfaces of said second diameter portion extending in excess of one-half the thickness of said crank.

4. The fastener joint of claim 3 wherein said wall surface of said first diameter portion extends from about one-quarter to about one-third the thickness of said crank arm.

5. The fastener joint of claim 2 wherein said knurled portion of said shaft includes a chamfered leading end portion, said chamfered end portion having a diameter less than said smaller diameter portion of said opening in said crank for preliminary positioning of said shaft in said opening.

6. A fastener joint comprising: a first member having first means formed thereon adapted to receive a second member, said second member having second means formed thereon for cooperative engagement with said first means in said first member, said first means including said first member having an opening formed therethrough from a top surface to a lower surface thereof, the opening at said top surface having a first smaller area wall surface tapering outwardly to a second larger area wall surface at said bottom surface, said second means including spline means formed on said second member, the area defined by the distance across said spline means corresponding generally to the area defined by said opening at the lower surface of said plate member whereby as said second member is inserted into said first member from the top surface thereof, the wall surface of said opening at said top surface is urged to flow into said larger area thereby positively securing said first and said second members.

7. The fastener joint of claim 6 wherein said first wall surface extends through said first member less than one-half the thickness of said first member from said top surface toward said bottom surface.

8. The fastener joint of claim 7 wherein said first wall surface extends from about one-quarter to about one-third the thickness of said first member.

* * * * *

UNITED STATES PATENT AND TRADEMARK OFFICE
CERTIFICATE OF CORRECTION

PATENT NO. : 4,118,134
DATED : October 3, 1978
INVENTOR(S) : Orin C. Mansel

It is certified that error appears in the above—identified patent and that said Letters Patent are hereby corrected as shown below:

Column 3, line 9:

After "breakout" insert --portion forms the outwardly tapering, roughened wall surface 26 of the larger diameter portion.

In a preferred embodiment, the smooth wall surface 28 of small diameter opening 22 extends less than one-half the total length of opening 20. About one-quarter to one-third the thickness of plate 12 is preferable. The larger diameter opening portion is formed in the remaining--.

Signed and Sealed this

Twenty-ninth Day of May 1979

[SEAL]

Attest:

RUTH C. MASON
Attesting Officer

DONALD W. BANNER
Commissioner of Patents and Trademarks